US007275677B2

(12) United States Patent
Juranitch et al.

(10) Patent No.: US 7,275,677 B2
(45) Date of Patent: Oct. 2, 2007

(54) SYNCHRONIZED TUBULAR FRICTION WELDING ARRANGEMENT

(75) Inventors: James C. Juranitch, Walled Lake, MI (US); Robert D. Olschefski, New Hudson, MI (US)

(73) Assignee: Veri-Tek International Corporation, Wixom, MI (US)

( * ) Notice: Subject to any disclaimer, the term of this patent is extended or adjusted under 35 U.S.C. 154(b) by 367 days.

(21) Appl. No.: 10/487,284

(22) PCT Filed: Aug. 20, 2002

(86) PCT No.: PCT/US02/26562

§ 371 (c)(1),
(2), (4) Date: Feb. 20, 2004

(87) PCT Pub. No.: WO03/066271

PCT Pub. Date: Aug. 14, 2003

(65) Prior Publication Data

US 2004/0238594 A1 Dec. 2, 2004

Related U.S. Application Data

(60) Provisional application No. 60/313,741, filed on Aug. 20, 2001, provisional application No. 60/313,734, filed on Aug. 20, 2001, provisional application No. 60/313,739, filed on Aug. 20, 2001.

(51) Int. Cl.
*B23K 31/02* (2006.01)
*B23K 20/12* (2006.01)

(52) U.S. Cl. .................... 228/114.5; 228/112.1; 228/2.1

(58) Field of Classification Search ............. 228/112.1, 228/2.1, 44.3, 173.2, 48, 44.5, 47.1, 49.1, 228/49.2, 114.5; 156/73.5
See application file for complete search history.

(56) References Cited

U.S. PATENT DOCUMENTS 3,269,002 A * 8/1966 Hollander et al. .......... 228/113

(Continued)

FOREIGN PATENT DOCUMENTS

EP 0 920 948 A2 6/1999

(Continued)

*Primary Examiner*—Jonathan Johnson
*Assistant Examiner*—Michael Aboagye
(74) *Attorney, Agent, or Firm*—Rohm & Monsanto, P.L.C.

(57) ABSTRACT

Method and apparatus for friction welding termination elements at first and second ends (21, 23) of a cylindrical shaft (15) in alaignment with an axis. A shaft receiver (17) receives the cylindrical shaft (15), and a first chuck (70) grips and rotates the cylindrical shaft (15) in alignment with the axis. A second chuck (75) grips the cylindrical shaft (15) and translates the second chuck (75) between first and second axial positions. A first termination receiver (155) receives the first termination (30) and axially translates same to a first installation position. An installation drive (90) urges the first termination (30) axially toward the cylindrical shaft (15) as it is rotated. A second termination receiver axially translates second termination (32) to a second installation position in allignment with the axis. A second installation drive (91) urges the second termination element (32) axially toward the cylindrical shaft as it is rotated. The first chuck (70) is rotated at approximately between 500 to 6000 rmp. The first installation drive arrangement (90) applies between 250 to 3000 pounds of axial force for between 1 and 15 seconds during a heating phase, and between 1500 to 12000 pounds of axial force for between 0.5 and 10 seconds during a forging phase.

44 Claims, 11 Drawing Sheets

U.S. PATENT DOCUMENTS

| | | | | |
|---|---|---|---|---|
| 3,388,849 A | * | 6/1968 | Blum et al. | 228/2.3 |
| 3,464,616 A | * | 9/1969 | Stamm | 228/2.3 |
| 3,595,462 A | * | 7/1971 | Hirayama | 228/2.3 |
| 3,678,566 A | | 7/1972 | Ellis et al. | 29/470.3 |
| 3,684,856 A | | 8/1972 | Lifshits et al. | 219/97 |
| 3,727,298 A | * | 4/1973 | Gage et al. | 156/73.5 |
| 3,776,446 A | * | 12/1973 | Gage et al. | 228/2.3 |
| 3,800,995 A | | 4/1974 | Franks et al. | 228/2 |
| 4,060,190 A | | 11/1977 | Paolini | 228/2 |
| 4,087,036 A | | 5/1978 | Corbett et al. | 228/102 |
| 4,414,046 A | * | 11/1983 | Palmer | 156/73.5 |

FOREIGN PATENT DOCUMENTS

| | | |
|---|---|---|
| FR | 1.416.365 | 9/1965 |
| FR | 1.455.696 | 9/1966 |
| JP | 09254296 | 9/1997 |
| JP | 11077338 | 3/1999 |
| JP | 200288746 | 10/2000 |
| WO | WO 00/25973 | 5/2000 |

* cited by examiner

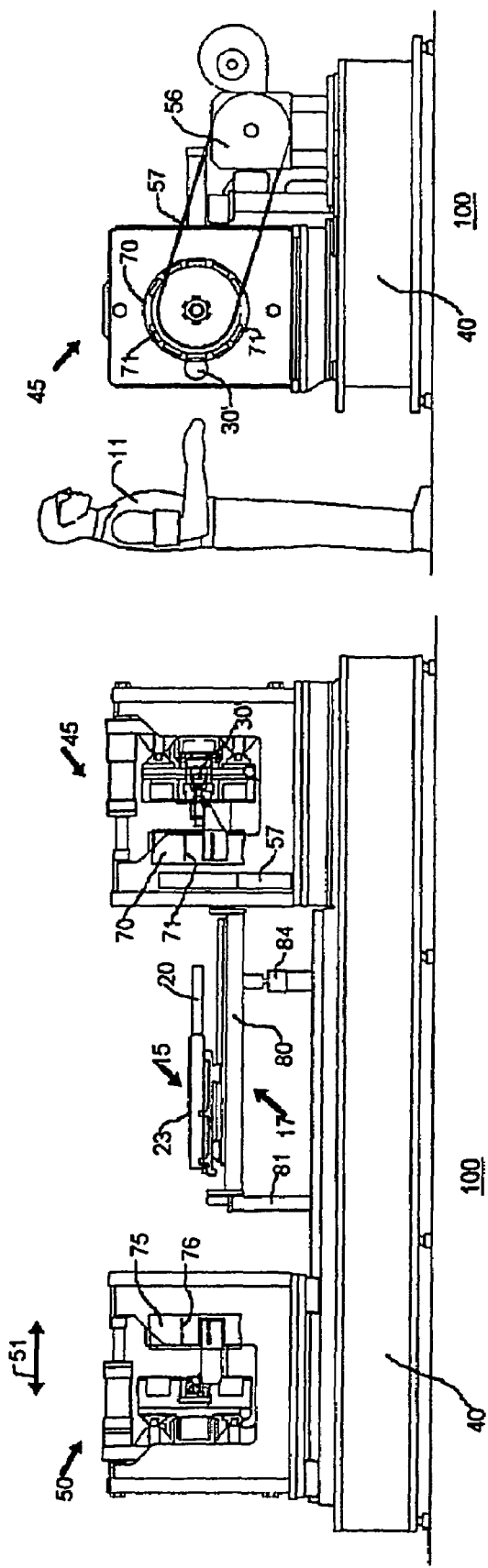

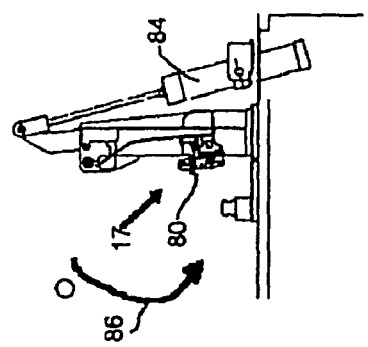
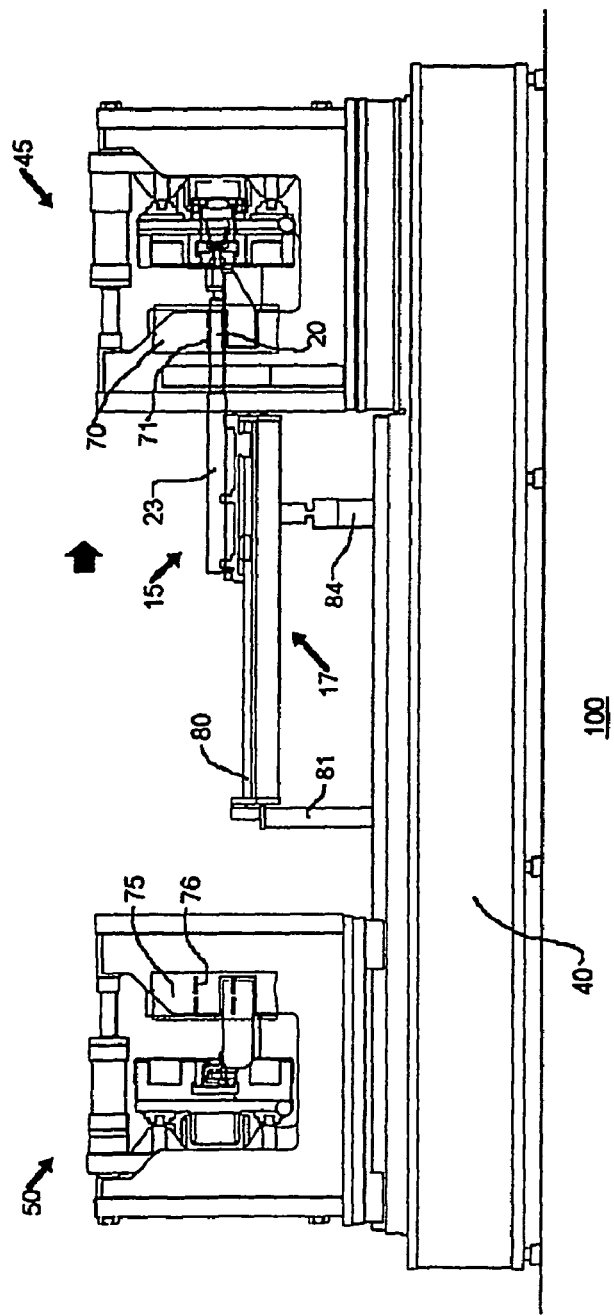
FIG. 3B
FIG. 3A

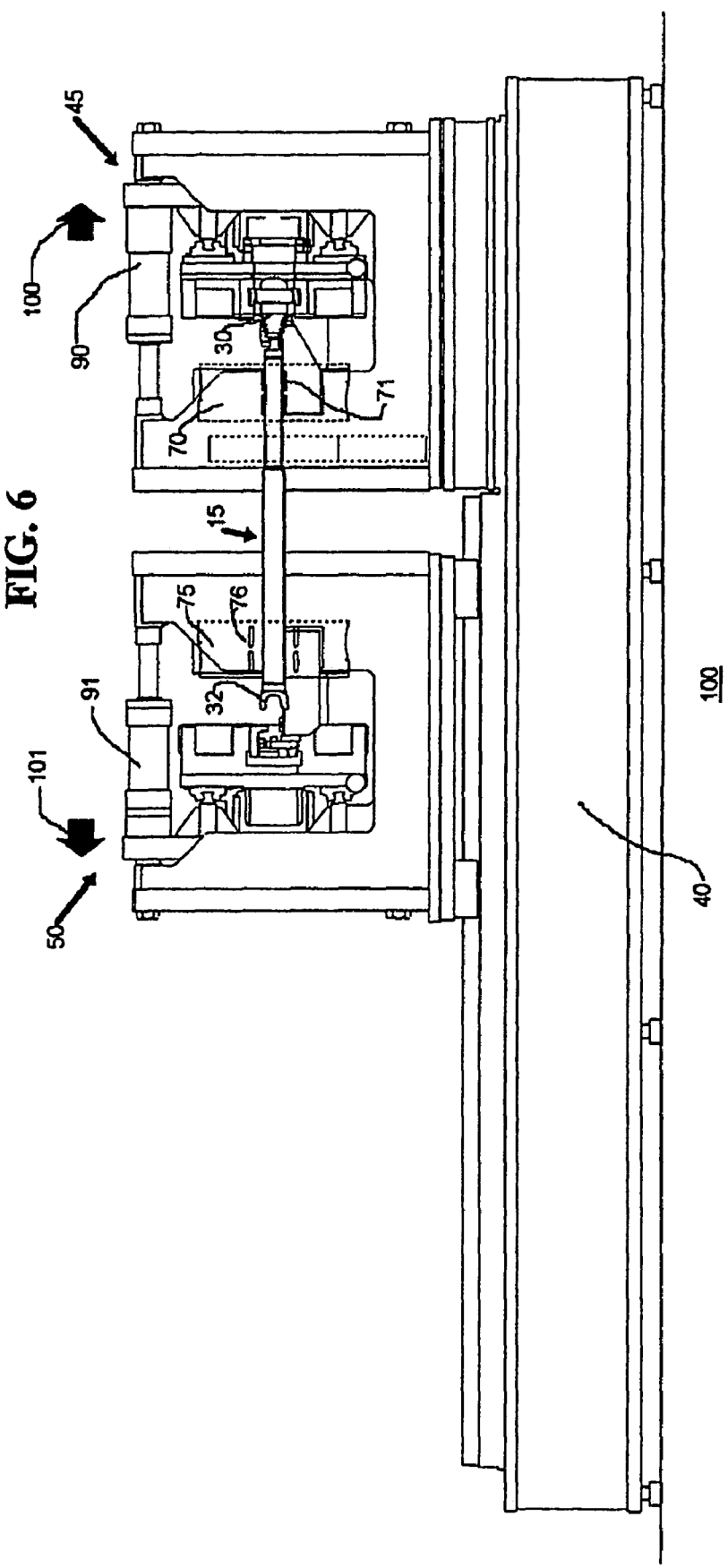

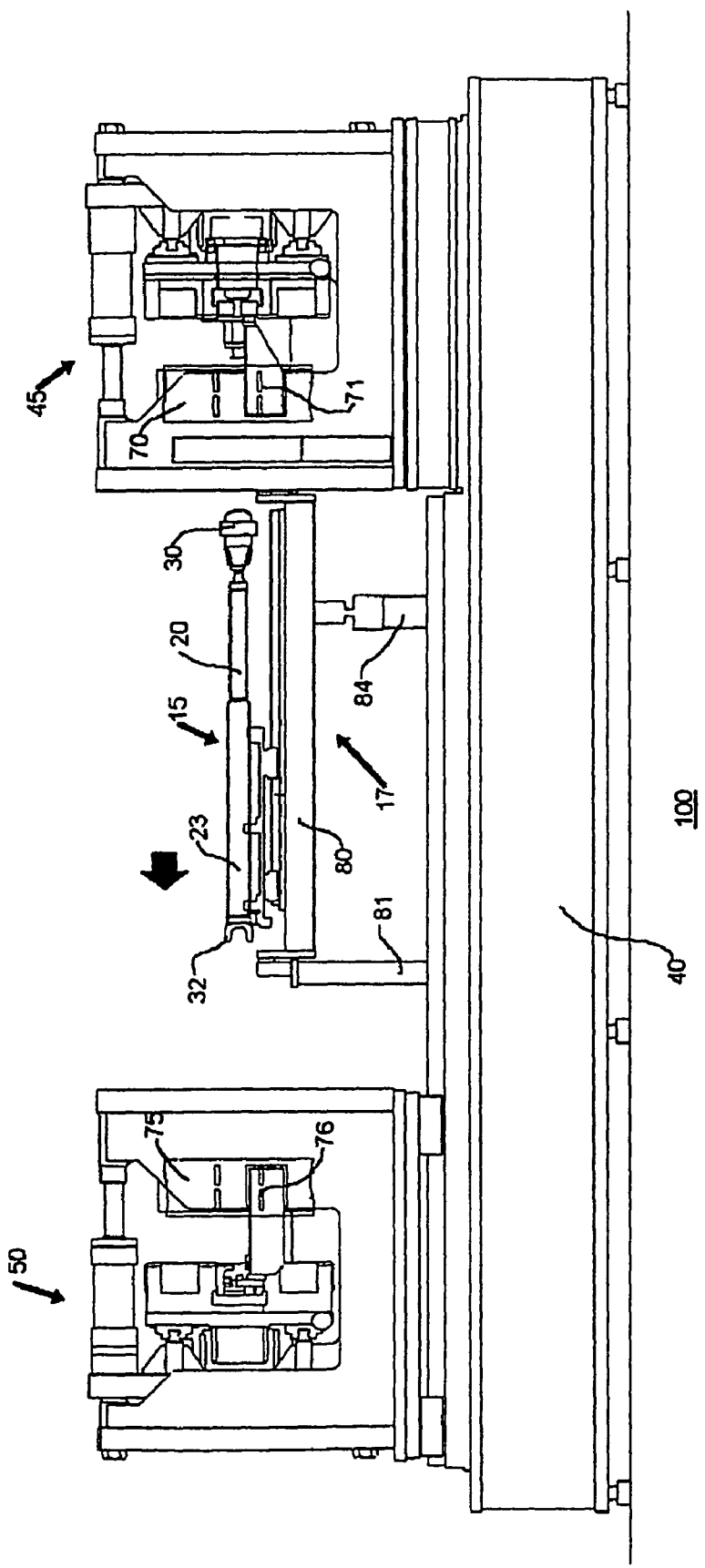

SYNCHRONIZED TUBULAR FRICTION WELDING ARRANGEMENT

RELATIONSHIP TO OTHER APPLICATION(S)

This application claims the benefit of the filing date of U.S. Provisional Patent Application Ser. Nos. 60/313,741; 60/313,734; and 60/313,739; all of which were filed on Aug. 20, 2001 in the names of the same inventors as herein.

BACKGROUND OF THE INVENTION

1. Field of the Invention

This invention relates generally to arrangements for welding tubular products, and more particularly, to a welding arrangement that will weld tubular products that require low cycle time, minimal misalignment, and near perfect radial alignment of the welded ends.

2. Description of the Related Art

To date many tubular products have been manufactured with the appropriate ends attached by conventional welding techniques. In the automotive industry, for example, particularly drive shaft manufacturing, the weld yokes, (or ends) often are pressed onto or into a tube end. After the press operation, the ends typically are welded by wire feed or other conventional welding techniques. The required press fit renders this method of manufacturing to be plagued with significant cost. It is of greater significance that only one end of the drive shaft is completed at a time. That is, after the completion of the first weld, the tube is turned over and reinserted into the known welding machine. Almost always the radial alignment and concentricity between the two ends is lost before the second weld yoke is attached. This form of manufacture, therefore, has significant inherent problems that are common in the industry. In addition, conventional wire feed welding imposes limits on the minimum wall thickness that can reliably be joined in production, and the quality of the weld cannot readily be ascertained.

In another known system, known magna pulse and magna arc methods are used in the construction of drive shafts and other tubular products. Again, typically one side of the tubular product is completed at a time. This causes set up problems that limit the ability to maintain radial alignment and verification of the quality of the weld is difficult to accomplish. Double ended magna arc or pulse welders are complex, difficult to repair and maintain, and expensive. In addition, They also require that extremely close tolerances be in squareness, cleanliness, and flatness of the components prior to and during the weld process to maintain a proper arc gap. This is difficult to accomplish and maintain in a production environment.

It is, therefore, an object of this invention to provide a system wherein the weld ends of a tubular assembly can be welded simultaneously in a simple, cost-effective and production robust manner.

It is also another object of this invention to provide a system wherein the weld ends of a tubular assembly can be maintained in a predetermined axial relationship as the ends are welded simultaneously.

It is another object of this invention to provide a welding arrangement that obviates the need for the press fit process and the associated close tolerance machining required for a press fit, as well as the additional material required on the yokes for the internal press fit.

It is also an object of this invention to provide a process that is cost effective, requires a short cycle time, holds near perfect concentricity of the tubular elements, and maintains near perfect radial alignment.

It is a further object of this invention to provide a welding system wherein a plurality of parameters that affect product quality can be recorded during the process to verify consistent weld quality.

It is additionally an object of this invention to provide an arrangement that can be applied in the welding of flat plate(s) to tubes or other forms of cylindrical stock.

It is yet a further object of this invention to provide a high level of precision and low cycle time in the manufacture of drive shafts, to preclude drive shafts that suffer from linear or radial misalignment in their welded ends, whereby high levels of noise, vibration and harshness (NVH) would result.

SUMMARY OF THE INVENTION

The foregoing and other objects are achieved by the present invention which provides, in accordance with an apparatus aspect thereof, an arrangement for welding first and second shaft termination elements at respective first and second ends of a cylindrical shaft, and in alignment with a predetermined axis. In accordance with this aspect of the invention, there is provided a shaft receiver for receiving the cylindrical shaft, and a first chuck assembly having a plurality of first gripping elements for gripping the cylindrical shaft at the first end thereof and maintaining the cylindrical shaft in alignment with the predetermined axis. A rotatory drive is coupled to the first chuck assembly. There is additionally provided a second chuck assembly having a plurality of gripping elements for gripping the cylindrical shaft at the second end thereof in alignment with the predetermined axis and a chuck assembly drive for translating the second chuck assembly between first and second axial positions. A first shaft termination element receiver receives the first shaft termination element and axially translates same to a first installation position in alignment with the predetermined axis. A first installation drive arrangement urges the first shaft termination element axially toward the cylindrical shaft as the cylindrical shaft is rotated in response to the rotatory drive. Additionally, a second shaft termination element receiver receives the second shaft termination element and axially translates same to a second installation position in alignment with the predetermined axis. A second installation drive arrangement urges the second shaft termination element axially toward the cylindrical shaft as the cylindrical shaft is rotated in response to the rotatory drive.

In a specific illustrative embodiment of the invention, there is additionally provided a shaft receiver drive arrangement for translating the shaft receiver between a first shaft receiver position where the cylindrical shaft is supported by the shaft receiver at a transaxial location that is substantially in axial alignment with the first chuck assembly, and a second shaft receiver position distal from the first shaft receiver position.

In one embodiment, the cylindrical shaft is axially displaceable with respect to the shaft receiver, and the chuck assembly drive includes a pneumatic drive.

In a further embodiment, the rotatory drive urges the first chuck assembly to rotate at approximately between 600 to 4000 rpm. In such an embodiment, the cylindrical shaft is a drive shaft for a vehicle, and the rotatory drive urges the first chuck assembly to rotate preferably at approximately between 600 to 4000 rpm.

The plurality of first gripping elements of the first chuck assembly includes, in certain embodiments, first and second sets of jaws. The first set of jaws is arranged to communicate with the cylindrical shaft prior to the second set of jaws, and may be regulated by mechanical cam. The first set of jaws may additionally include a precision alignment arrangement for locking the cylindrical shaft at a predetermined axial location. Such a precision alignment arrangement includes a plurality of angulated guideways associated with respective jaws of the first set of jaws, the angulated guideways having a precise angular orientation with respect to one another. The plurality of angulated guideways are equiangularly distributed about the predetermined axis.

The second set of jaws is provided, in certain embodiments, with a clamping arrangement for locking the cylindrical shaft at the predetermined axial location determined by the first set of jaws. Preferably, the first and second sets of jaws are hydraulically actuated, whereby the second set of jaws is operated in response to a first hydraulic pressure applied to the first set of jaws exceeding a predetermined break-over first hydraulic pressure value. The break-over first hydraulic pressure has a magnitude sufficient to cause the first set of jaws to lock the cylindrical shaft at the predetermined axial location.

In a further embodiment of the invention, there is provided a non-rotating housing about which the first chuck assembly is rotated by the rotatory drive. The first chuck assembly is installed on a rotatable housing, and there is further provided a fluid delivery arrangement disposed at the interface of the non-rotating and the rotatable housings. In one embodiment of this first apparatus aspect of the invention, the fluid delivery arrangement is provided with a first fluid channel system for supplying pressurized clamping fluid for causing the first chuck assembly to grip the cylindrical shaft and a second fluid channel system for supplying pressurized unclamping fluid for causing the first chuck assembly to release the cylindrical shaft. There is provided in the first fluid channel system a first fluid passageway at the interface of the non-rotating and the rotatable housings. In this embodiment, the second fluid channel system has a first fluid passageway at the interface of the non-rotating and the rotatable housings, and there is further provided a pressurized fluid supply port installed on the non-rotating housing. Additionally, there is provided a fluid drain port installed on the non-rotating housing.

A bearing arrangement is interposed between the non-rotating and the rotatable housings, and there is further provided a fluid seal for limiting flow of a pressurized fluid through the bearing arrangement.

In a further embodiment of the invention, the first and second installation drive arrangements urge the first and second shaft termination elements, respectively, axially toward the cylindrical shaft as the cylindrical shaft is rotated by applying respective first and second axial forces in respective axially opposing directions. The respective first and second axial forces each are exerted at respective magnitudes of axial force for respective determined periods of time. At least one of the first and second axial forces is applied at a plurality of magnitudes of axial force for respective determined sequential periods of time. In another embodiment, at least one of the first and second axial forces is applied in response to a distance of axial displacement resulting from the application of the respective first and second axial forces. The respective determined sequential periods of time correspond to engagement phases of an installation of the first shaft termination element. In an advantageous embodiment, the engagement phases of the installation of the first shaft termination element comprise a heating phase and a forging phase. In an embodiment where the cylindrical shaft is a drive shaft for a vehicle, the first installation drive arrangement is operated to apply approximately between 250 to 1000 pounds of axial force for a duration of approximately between 1.5 and 3 seconds during the heating phase, and applies approximately between 2500 to 12000 pounds of axial force for a duration of approximately between 2 and 5 seconds during the forging phase.

Prior to performing the heating and forging phases there is provided in one embodiment the further phase of scrubbing the first shaft termination element against the first end of the cylindrical shaft. In an embodiment applied to a drive shaft for a vehicle, the first installation drive arrangement is operated to apply approximately between 50 to 350 pounds of axial force for a duration of approximately between 0.5 and 2 seconds during the further phase of scrubbing.

In a still further embodiment, at least one of the first and second axial forces is applied in response to a temperature resulting from the application of the respective first and second axial forces, the temperature being controlled in response to the modulation of the weld force between tube ends and their respective yokes while rotating the tube. The cylindrical shaft is rotated at a fixed preselected speed that is determined in response to the diameter of the cylindrical shaft. In some embodiments, the cylindrical shaft is rotated at a speed that achieves a determined rotational surface speed of the cylindrical shaft.

In accordance with a method aspect of the invention, there is provided a method of welding first and second shaft termination elements at respective first and second ends of a cylindrical shaft, and in alignment with a predetermined axis, the inventive method provides the steps of:

cylindrical shaft loading a cylindrical shaft having first and second ends onto a shaft receiver located at a proximal location, whereby the cylindrical shaft is supported so that its longitudinal axis is substantially coaxial with the predetermined axis;

first element loading the first shaft termination element onto a first shaft termination element receiver;

second element loading the second shaft termination element onto a second shaft termination element receiver;

first translating the first shaft termination element receiver whereby a principal axis of the first shaft termination element is disposed coaxially with the predetermined axis;

second translating the second shaft termination element receiver whereby a principal axis of the second shaft termination element is disposed coaxially with the predetermined axis;

axially urging the cylindrical shaft toward the first shaft termination element and through a first chuck assembly;

first actuating the jaws of the first chuck whereby the cylindrical shaft is clamped in the region of the first end thereof to a transaxial location where the longitudinal axis of the cylindrical shaft is coaxial with the predetermined axis;

axially translating the second shaft termination element and a second chuck assembly to a predetermined axial location in the region of the second end of the cylindrical shaft;

second actuating the jaws of the second chuck whereby the cylindrical shaft is clamped in the region of the second end thereof to a transaxial location where the longitudinal axis of the cylindrical shaft is coaxial with the predetermined axis;

rotating the first chuck at a predetermined rate of rotation;

first urging the first shaft termination element axially into communication with the first end of the cylindrical shaft; and second urging the second shaft termination element axially into communication with the second end of the cylindrical shaft.

In one embodiment of this method aspect of the invention, prior to performing the step of axially translating, there is further provided the step of withdrawing the shaft receiver to a distal location.

In a further embodiment, there are further provided the steps of:

first releasing a first axial force applied to the first shaft termination element in response to the step of first urging;

second releasing a second axial force applied to the second shaft termination element in response to the step of second urging;

releasing the jaws of the second chuck; and withdrawing axially the second chuck assembly to a distal axial location.

The further may include the additional steps of:

restoring the shaft receiver to the proximal location;

releasing the jaws of the first chuck; and reverse axially urging the cylindrical shaft out of the first chuck assembly, whereby the cylindrical shaft is supported by the shaft receiver.

In some embodiments the step of first actuating includes the further steps of:

first subset actuating a first subset of jaws;

controlling the performance of the step of first subset actuation to ensure all of the jaws in the first subset of jaws maintain an equal radial relationship during the step of first subset actuation with respect to the predetermined axis.

In further embodiments, the step of first actuating includes the further step of second subset actuating a second subset of jaws, the step of second subset actuating being performed after the step of first subset actuating. The step of first actuating is performed in response to a step of applying an hydraulic pressure, and the step of second subset actuating is performed in response to the hydraulic pressure exceeding a predetermined hydraulic pressure magnitude.

In accordance with a further method aspect of the invention, there is provided a method of welding a shaft termination element an end of a cylindrical shaft that includes the steps of:

gripping the cylindrical shaft with a plurality of coordinated grippers whereby the cylindrical shaft is retained coaxially with a predetermined axis;

further gripping the cylindrical shaft with a plurality of further grippers whereby the cylindrical shaft is retained with additional force coaxially with the predetermined axis;

loading the shaft termination element onto a shaft termination element receiver;

translating the shaft termination element receiver whereby a principal axis of the shaft termination element is disposed coaxial with the predetermined axis; and axially urging the cylindrical shaft and the shaft termination element toward each other.

In one embodiment of the invention, there is further provided the step of releasing partially the cylindrical shaft during rotation of same to permit self-centering.

In a further embodiment, the step of gripping the cylindrical shaft is performed on a cylindrical shaft datum. The step of loading the shaft termination element includes, in certain embodiments, the further step of gripping the shaft termination element on a shaft termination datum. Additionally, the step of translating includes the further step of establishing a spatial relationship between the cylindrical shaft datum and the shaft termination datum. The use of such datums enables high runout accuracy to be achieved, illustratively on the order of 0.006 inches T.I.R., down to 0.002 inches T.I.R., when components permit.

In one embodiment of the further method aspect of the invention there is further provided the step of welding the cylindrical shaft and the shaft termination element to each other. The step of welding includes, in certain embodiments, the further steps of:

rotating the chuck at a predetermined rate of rotation; and urging the shaft termination element axially into communication with a first end of the cylindrical shaft whereupon a friction weld is formed.

In some situations, the cylindrical shaft might not be true, so as to have a slight bend, but still be within determined parameters. When rotated initially, such a shaft will be difficult to weld. It is desirable to release partially the clamping of the shaft whereby it is free to self-center during slow initial rotation. In this manner, a reasonably centered clamping of a slightly bent shaft can be achieved.

The step of urging the shaft termination element axially into communication with a first end of the cylindrical shaft is terminated in response to a step of measuring a thermal emissivity during of the period that the step of urging is performed. There is further provided the step of measuring a duration of the period during which the step of urging is performed. In other embodiments, there is further provided the step of measuring a thermal emissivity during of the period that the step of urging is performed. In yet further embodiments, there is provided the step of measuring an axial displacement of the shaft termination element relative to the first end of the cylindrical shaft during of the period that the step of urging is performed. In a manufacturing environment where it is desired to achieve a predetermined overall length for the combined shaft and shaft termination element, the axial displacement caused during the urging of the shaft termination onto the shaft can be varied.

In other embodiments, there are provided the steps of:

discontinuing the step of rotating the chuck; and forging the shaft termination element with the first end of the cylindrical shaft.

The step of discontinuing the step of rotating the chuck is performed in response to a step of measuring a thermal emissivity during of the period that the step of urging is performed.

In another embodiment, there are further provided the steps of:

further loading a further shaft termination element onto a further shaft termination element receiver;

further translating the further shaft termination element receiver whereby a principal axis of the further shaft termination element is disposed coaxial with the predetermined axis; and further axially urging the cylindrical shaft and the further shaft termination element toward each other.

The steps of axially urging and further axially urging are performed simultaneously to achieve a weld at both ends of the cylindrical shaft simultaneously. At least one of the steps of axially urging and further axially urging are controlled in response to a step of monitoring a thermal emissivity during the at least one of the steps of axially urging and further axially urging. Additionally, there is provided the further step of further monitoring a thermal emissivity, whereby both ends of the cylindrical shaft are thermally monitored.

During performance of the steps axially urging and further axially urging, the shaft termination element, the cylindrical shaft, and the further shaft termination element are maintained coaxially with the predetermined axis. In certain embodiments, the steps of axially urging and further axially urging are performed sequentially.

In a still further embodiment, there are further provided the steps of:

discontinuing the step of rotating the chuck;

forging the shaft termination element with the first end of the cylindrical shaft; and further forging the further shaft termination element with the second end of the cylindrical shaft, the steps of forging and further forging being performed simultaneously.

The step of forging includes the step of applying an axial force between the shaft termination element and the first end of the cylindrical shaft of approximately between 2500 and 12000 pounds.

There is additionally provided in certain embodiment the step of further welding the cylindrical shaft and the further shaft termination element to each other. The step of further welding includes the further step of urging the further shaft termination element axially into communication with a second end of the cylindrical shaft whereupon a further friction weld is formed.

BRIEF DESCRIPTION OF THE DRAWING

Comprehension of the invention is facilitated by reading the following detailed description, in conjunction with the annexed drawing, in which:

FIG. 2A is a simplified schematic front representation of the synchronous welding system of FIG. 1;

FIG. 2B is a simplified schematic side representation of the synchronous welding system of FIG. 2A;

FIG. 3A is a simplified schematic front representation of the synchronous welding system of FIG. 1 showing a tubular portion of a drive shaft having been translated to the left so as to be within a drive chuck arrangement and in position for communication with a first end piece;

FIG. 3B is a simplified schematic side representation of a portion of the synchronous welding system of FIG. 3A showing a drive shaft support in a withdrawn position;

FIG. 6 is a simplified schematic front representation of the synchronous welding system of FIG. 1 in the condition of release of the axial force (in the direction of the arrows) arrangement with the drive shaft and the driven chuck in a disengaged condition;

FIG. 9 is a simplified schematic front representation of the synchronous welding system of FIG. 1 with the drive chuck assembly in the released condition, and the completed drive shaft with the end pieces affixed thereto;

DETAILED DESCRIPTION

Figure 1:
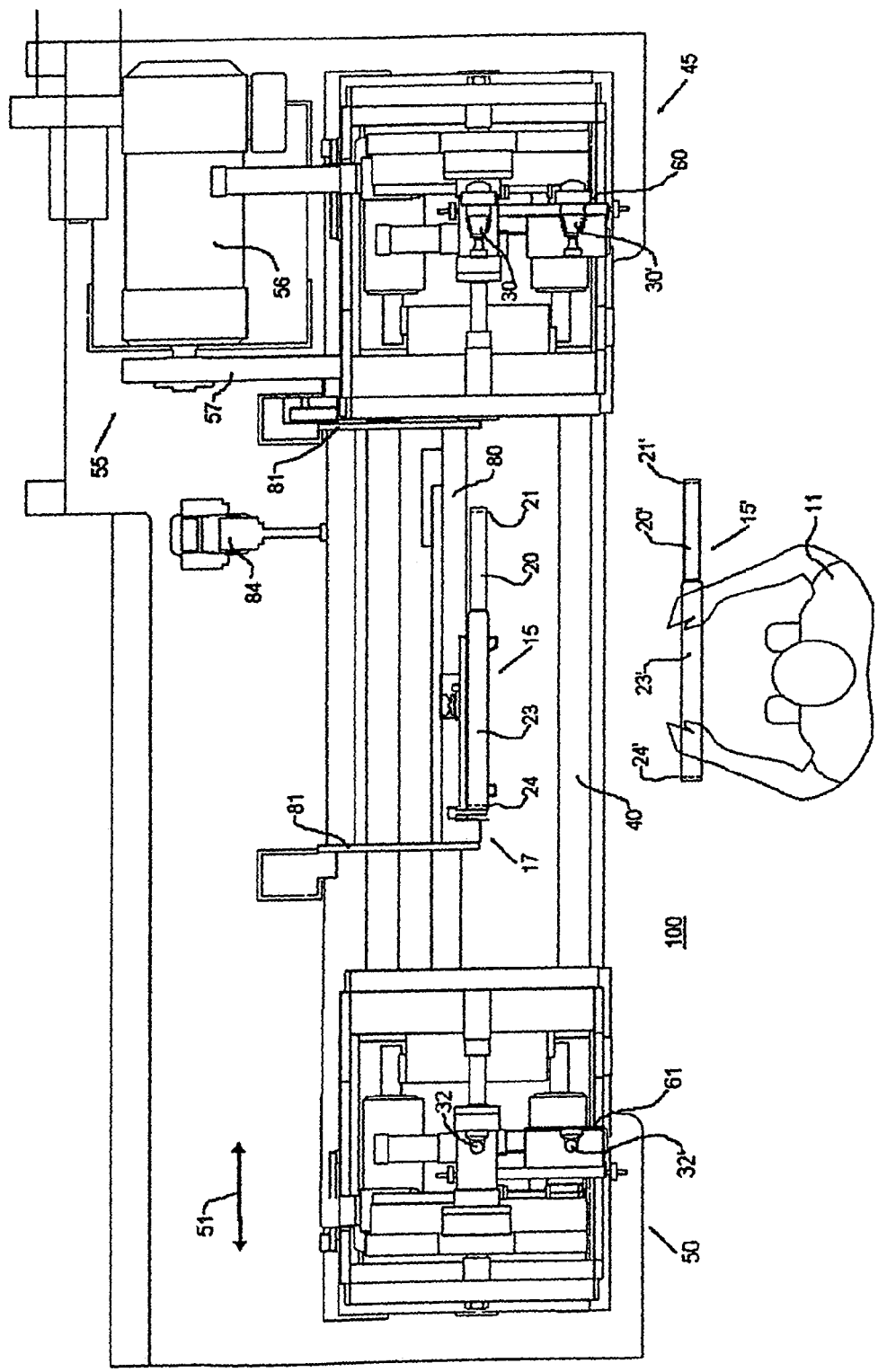
FIG. 1 is a simplified schematic representation of a synchronous welding system constructed in accordance with the principles of the invention, as viewed from above.

FIG. 1 is a simplified schematic representation of a synchronous welding system 100 constructed in accordance with the principles of the invention, as represented from above. As shown in this figure, a human operator 11 loads a drive shaft tube 15 onto a deployable drive shaft support that is designated generally as 17 that will be discussed in greater detail below in connection with FIGS. 3B and 9. Human operator 11 may be replaced, in other embodiments of the invention, with a robotic delivery system (not shown). The human operator is shown in this figure to be holding a further drive shaft tube, designated herein as drive shaft tube 15'. Drive shaft tube 15' is in all respects substantially identical to drive shaft tube 15 that is shown to be already installed on deployable drive shaft support 17, and its corresponding portions are similarly designated, but with the addition of a prime (').

Drive shaft tube 15 is shown to have a first portion 20 having a first diameter determined at a first datum line 21. The drive shaft tube also has a second portion 23 having a second diameter determined at a second datum line 24. Datum lines 21 and 24 are used as the reference for most dimensions of the drive shaft tube during manufacture thereof. The end to be achieved in the processing to be effected by synchronous welding system 100 on drive shaft tube 15 is the installation by friction welding of a first end piece 30, which in this embodiment of the invention is a constant velocity joint, onto the end of first portion 20, and the installation of a second end piece 32, which in this embodiment of the invention is a portion of a universal joint, onto the end of second portion 23. Such installation of the first and second end pieces is to be performed simultaneously while, in this specific illustrative embodiment of the invention, all of the elements are supported on a common axis, to achieve high radial and axial alignment as described herein.

Synchronous welding system 100 is comprised of several major subsystems that include, in this specific illustrative embodiment of the invention, a base 40, a driven chuck assembly designated generally as 45, a translatable chuck assembly designated generally as 50. Driven chuck assembly 45 is installed on base 40 and has associated therewith a rotatory drive arrangement designated generally as 55. Rotatory drive arrangement 55 in this embodiment, has an electric motor 56 that is mechanically coupled to driven chuck assembly 45 by a drive belt 57 that transfers rotatory energy from electric motor 56 to driven chuck assembly 45. In this embodiment, a fixture in the form of a driven chuck assembly 45 and electric motor 56 maintain their position with respect to base 40 during all operations. However, translatable chuck assembly 50 is translatable in the direction of dual-head arrow 51 along base 40. Such translation of translatable chuck assembly 50 is effected by any known means, including pneumatic and/or hydraulic actuation (not shown). Finally, there is provided the aforementioned deployable drive shaft support 17, which as will be described is deployable to avoid interference with the translation of translatable chuck assembly 50.

FIG. 1 additionally shows that a further first end piece 30' and a further second end piece 32' are shown to be pre-loaded in receptacles 60 and 61 of the respective chuck assemblies 45 and 50. More specifically, in this specific illustrative embodiment of the invention, further first end piece 30' is pre-installed in receptacle 60 which, as will be described below, clamps onto further first end piece 30' and transports same to the location of first end piece 30 after first end piece 30 has been installed onto drive shaft tube 15. Similarly, further second end piece 32' is pre-installed in receptacle 61, and also clamps onto further second end piece 32' and transports same to the location of second end piece 32 after second end piece 32 has been installed onto drive shaft tube 15.

FIG. 2A is a simplified schematic front representation of synchronous welding system 100 of FIG. 1. Elements of structure that previously have been discussed are similarly designated. As shown in FIG. 2A, driven chuck assembly 45 has a chuck assembly 70 that is shown in this figure to have a plurality of chuck jaws 71 in an open condition. Similarly, translatable chuck assembly 50 has a chuck assembly 75 that is shown in this figure to have a plurality of chuck jaws 76 in an open condition.

The drive shaft tube is shown in this figure to be supported by deployable drive shaft support 17. The deployable drive shaft support is formed of a support platform 80 that is itself supported to be pivotable on hinged arms 81, pivotal deployment of deployable drive shaft support 17 being effected by actuation of an hydraulic cylinder 84.

FIG. 2B is a simplified schematic side representation of the synchronous welding system of FIG. 2A, and shows the rotatory coupling between electric motor 56 and chuck assembly 70 via drive belt 57. In this figure, chuck assembly 70 is shown to have a plurality of chuck jaws 71 distributed circumferentially thereabound. Also, an end representation of further first end piece 30' is shown in this figure to facilitate comprehension of its spatial relationship in the uninstalled position with respect to the rotating center of chuck assembly 70.

FIG. 3A is a simplified schematic front representation of the synchronous welding system of FIG. 1 showing drive shaft tube 15 having been translated to the right so as to be within chuck assembly 70. Elements of structure that previously have been discussed are similarly designated. Chuck jaws 71 are shown to be closed on first portion 20 of drive shaft tube 15. In the present specific illustrative embodiment of the invention, chuck assembly 70 may have over 12 chuck jaws 71. Accuracy of the clamping is achieved by a sequential closure of the chuck jaws. More specifically, in this specific illustrative embodiment of the invention, three chuck jaws (not specifically designated) are first closed on first portion 20 of drive shaft tube 15. The three jaws are controlled in their operation by a cam plate (not specifically identified) that ensures that the three chuck jaws maintain radial equality as they translate radially toward, and communicate with first portion 20 of drive shaft tube 15. Once the controlled three of chuck jaws 71 are closed against drive shaft tube 15, then the remaining chuck jaws are closed without disturbing the axial location of drive shaft tube 15 established during closure of the three cam-controlled chuck jaws. In one embodiment, chuck jaws 71 are hydraulically actuated, and sequential operation of the closure of the chuck jaws is effected by hydraulic pressure break-over that results from the hydraulic pressure build-up that results from the engagement of the three cam-controlled chuck jaws. That is, as the three cam-controlled chuck jaws communicate with first portion 20 of drive shaft tube 15, hydraulic pressure builds in the supply system (not shown). Upon reaching a predetermined hydraulic pressure that is of sufficient magnitude to ensure axially stable engagement of drive shaft tube 15, hydraulic fluid, illustratively by operation of a pressure-responsive valve (not shown) is diverted to actuate selective ones or all of the remaining chuck jaws.

FIG. 3B is a simplified schematic side representation of a portion of the deployable drive shaft support 17 portion of synchronous welding system 100 showing deployable drive shaft support 17 in a withdrawn position. As shown, in this specific illustrative embodiment of the invention, extension of hydraulic cylinder 84 causes support platform 80 to be pivoted in the direction of arrow 86. Such pivotal withdrawal of support platform 80 is required to prevent collision with translatable chuck assembly 50 when it is translated along base 40 as described below.

Figure 4:
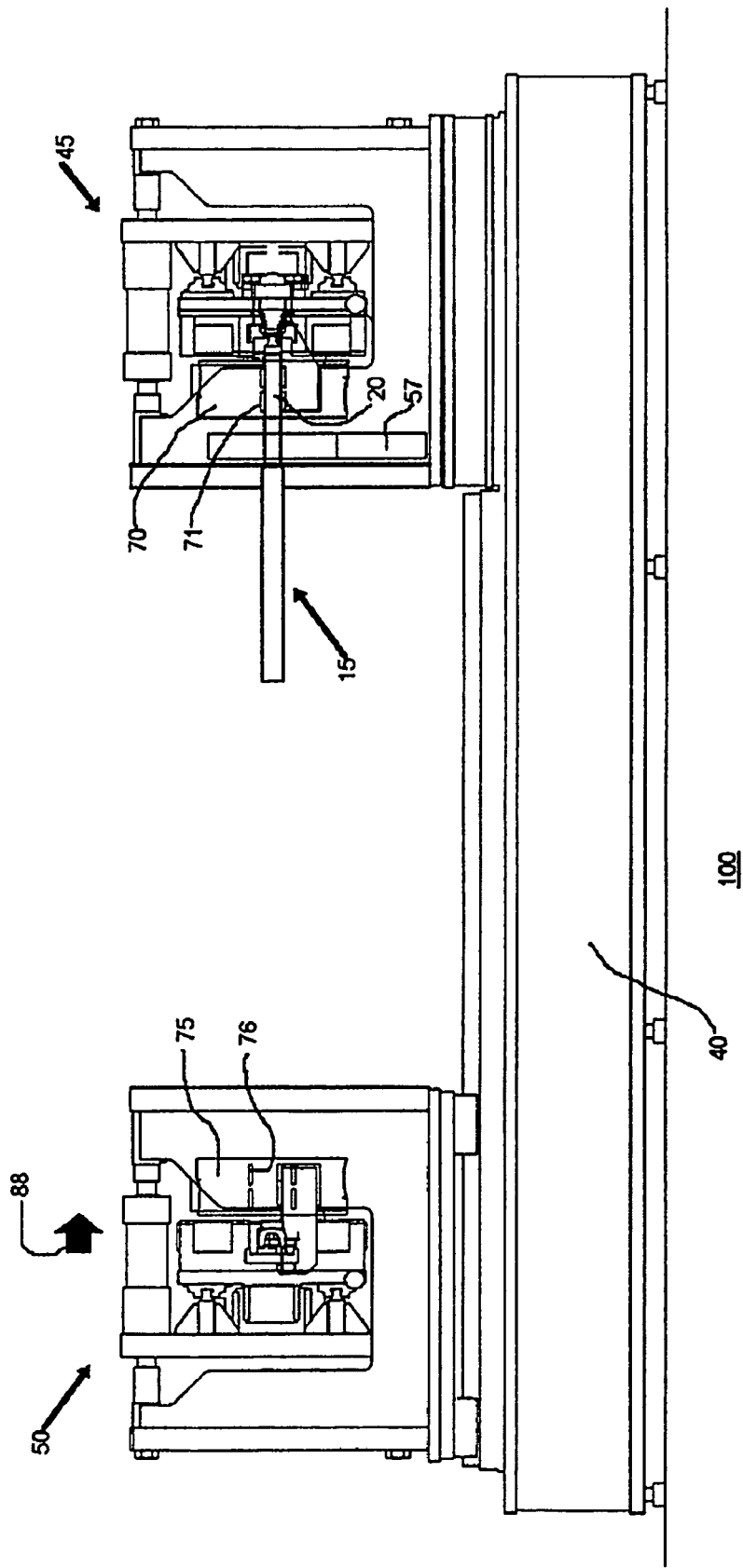
FIG. 4 is a simplified schematic front representation of the synchronous welding system of FIG. 1 in the condition of FIG. 3A and further showing that a driven chuck arrangement is to be translated toward the left to engage the drive shaft.

FIG. 4 is a simplified schematic front representation of synchronous welding system 100 wherein deployable drive shaft support 17 is in the condition of FIG. 3A. Elements of structure that previously have been discussed are similarly designated. Deployable drive shaft support 17 (not shown in this figure) has been withdrawn. As shown, chuck jaws 71 of chuck assembly 70 are shown in an engaged condition with first portion 20 of drive shaft tube 15. Translatable chuck assembly 50, however, is shown to have chuck jaws 76 of chuck assembly 75 to be in the open condition. Translatable chuck assembly 50 is therefore ready to be translated leftward, in the direction of arrow 88.

Figure 5:
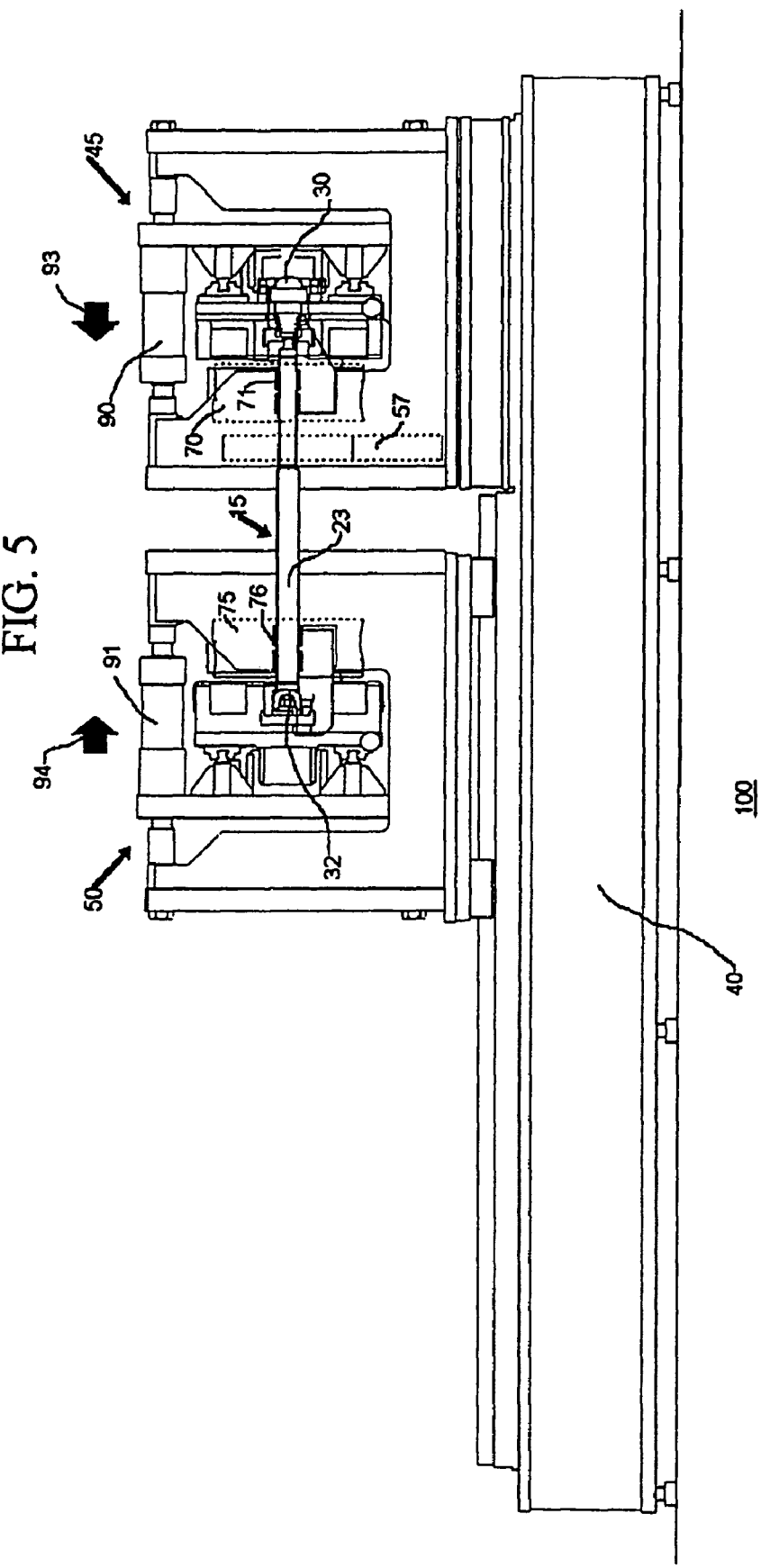
FIG. 5 is a simplified schematic front representation of the synchronous welding system of FIG. 1 in the condition of engagement of the driven chuck arrangement with the drive shaft, and further shows that the end pieces are urged in the direction of the arrows to effect friction welding as the driven chuck arrangement is rotated, with the chucks engaged.

FIG. 5 is a simplified schematic front representation of synchronous welding system 100 wherein translatable chuck assembly 50 has been translated leftward, and chuck jaws 76 of chuck assembly 75 are closed to communicate with second portion 23 of drive shaft tube 15. In this specific illustrative embodiment of the invention, the closure of chuck jaws 76 is effected in accordance with the procedure described hereinabove in connection with the closure of chuck jaws 71 of chuck assembly 70. More specifically, three chuck jaws (not specifically designated) are first closed on first portion 23 of drive shaft tube 15. The three jaws are controlled in their operation by a cam plate (not specifically identified in this figure) that ensures that the three chuck jaws maintain radial equality as they translate radially toward, and communicate with first portion 23 of drive shaft tube 15. The cam plate is shown cross-sectionally in FIG. 11B. Once the controlled three of chuck jaws 76 are closed against drive shaft tube 15, then the remaining chuck jaws are closed without disturbing the axial location of drive shaft tube 15 established during closure of the three cam-controlled chuck jaws. As previously described, the chuck jaws are hydraulically actuated, and sequential operation of the closure of the chuck jaws is effected by hydraulic pressure break-over that results from the hydraulic pressure build-up that results from the engagement of the three cam-controlled chuck jaws.

As shown in FIG. 5, chuck jaws 71 and chuck jaws 76 being engaged with drive shaft tube 15 permits the rotatory motion that is applied to chuck assembly 70 by operation of electric motor 56 (not shown in this figure) and drive belt 57 to transmit via drive shaft tube 15 to chuck assembly 75. Thus, chuck assembly 70, drive shaft tube 15, and chuck jaws 76 rotate as a unit. Once drive shaft tube 15 is rotated, hydraulic actuators 90 and 91 are shown to be drawn in so as to urge first end piece 30 and second end piece 32 axially in the directions of respective arrows 93 and 94. However, first end piece 30 and second end piece 32 are clamped so as not to be rotatable. Thus, when the non-rotatable end pieces are urged into communication with rotating drive shaft tube 15, the friction causes a heat sufficient to effect welding to be generated. During the frictional heating, first end piece 30, drive shaft tube 15, and second end piece 32 are maintained in precise axial alignment.

In accordance with the invention, the force applied in the directions of respective arrows 93 and 94 is not necessarily constant, and may be applied in stages. More specifically, in one specific illustrative embodiment of the invention, there is provided a first force stage where the end pieces are each merely scuffed against the rotating drive shaft tube 15 in order to square-off the mating surfaces. In a practical embodiment of the invention, this first stage, which may be termed a "scrub" stage, has a duration of approximately one (1) second. The axial force applied during this first stage may be on the order of several hundred pounds. Then, in a second stage, additional axial force is applied to effect the heating to a level adequate to achieve welding. This second stage, which may be termed a "heating" stage, may in one embodiment have a duration of approximately two (2) seconds. The axial force applied during this second stage may be approximately between four hundred and two thousand (400-2000) pounds.

In a highly advantageous embodiment of the invention, the temperature during heat phase is monitored with commercially available equipment to insure that the weld temperature of each end of the tube and their respective yokes is correct to obtain a proper weld. Proper temperature is obtained, in a practical embodiment, by modulating the magnitude of the weld force between the tube ends and their respective yokes while rotating the tube at a fixed preselected speed. This method allows components of different diameters at each end to be welded successfully. It is to be noted that different diameters will have different surface speeds, and since the heat generated is a function of surface speed and the applicable coefficient of friction, the variation in the applied force will make up for the difference in the surface speed of each end of the tube. The coefficient of friction, of course, is constant for the same material, i.e., at both ends of same tube.

Finally, in a third stage a forging axial force is applied simultaneously to first end piece 30 and second end piece 32. The third stage may, in one embodiment of the invention have a duration of approximately three and one-half (3.5) seconds. The axial force applied during this third stage may be approximately six thousand (6000) pounds. As stated, precise axial alignment is maintained between the components, ultimately resulting in an axially true drive shaft.

It is therefore seen that three methods of accomplishing both welds at one time are disclosed for this invention. The first is an open loop system where the thermal and force characteristics of the weld are only recorded and verified. This verification data is compared against predetermined acceptable weld criteria. The data may be derived from thermal sensors and pressure transducers (not shown). In addition, a linear displacement transducer may, in certain embodiments, be employed to ascertain the extent to which the axial dimension of the drive shaft is affected by the welding process. The second method involves monitoring of the distance per stage. The third and preferred method is the closed loop control of burn off, heat up, and forge force. This is accomplished in some embodiments from the feedback obtained from a thermal probe (not shown) that produces a data signal that may be applied against a predetermined weld temperature set point and acted upon by a system controller (not shown). The feedback pressure sensor is correlated to the forge force applied in the referenced third stage of the friction weld. In this closed loop method, the forge force is the primary control loop in the final stage of the friction weld. The force on the servo rams is the inner, cascaded control loop in the burn off (first stage) and heat up (second stage) portions of the weld process. The finished length, as measured by a linear gauge (not shown) is verified, but is not a primary control parameter.

FIG. 6 is a simplified schematic front representation of synchronous welding system 100 in the condition of releasing of the axial force (in the direction of the arrows 100 and 101) arrangement with the drive shaft and the driven chuck in a disengaged condition. Elements of structure that previously have been discussed are similarly designated.

As shown in FIG. 6, hydraulic actuators 90 and 91 are in extended position, whereby the axial forging force on drive shaft tube 15 exerted via first end piece 30 and second end piece 32 has been released. In addition, chuck jaws 76 of chuck assembly 75 are opened, and therefore translatable chuck assembly 50 is now ready to be translated in the direction of arrow 101.

Figure 7:
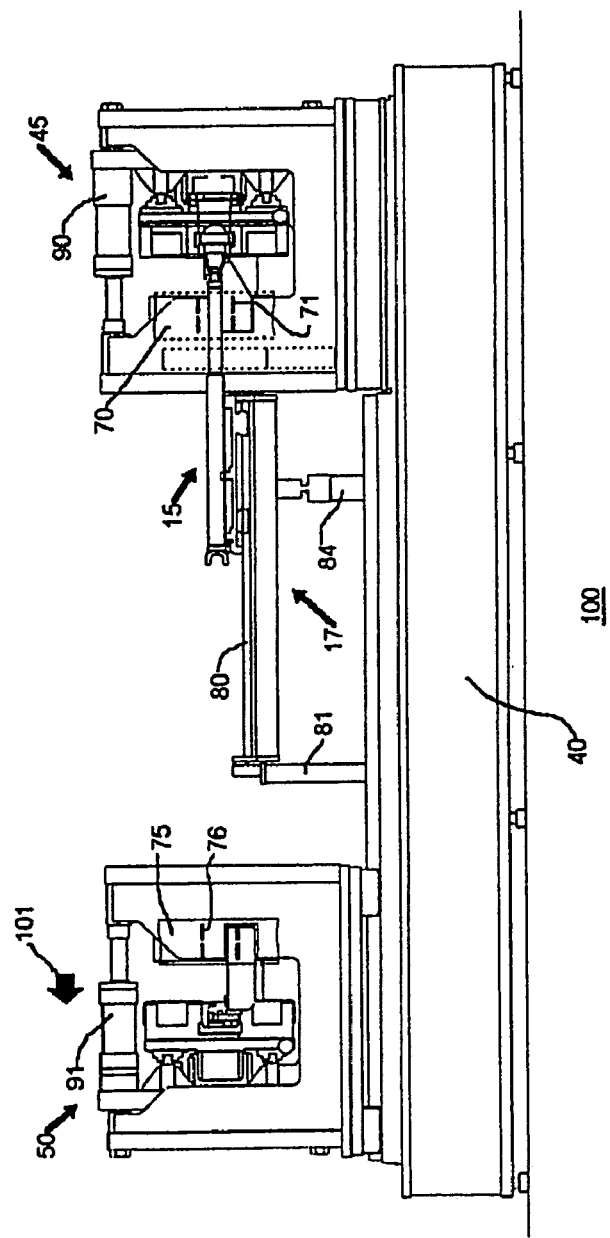
FIG. 7 is a simplified schematic front representation of the synchronous welding system of FIG. 1 with the driven chuck assembly having been restored to the left, disengaged from the drive shaft.

FIG. 7 is a simplified schematic front representation of synchronous welding system 100 with translatable chuck assembly 50 having been restored to the left, and thereby is disengaged from drive shaft tube 15, which now forms a portion of a completed drive shaft. Elements of structure that previously have been discussed are similarly designated. In this figure, deployable drive shaft support 17 is shown in the deployed condition ready to accept drive shaft tube 15 with first end piece 30 and second end piece 32 installed thereon.

Figure 8:
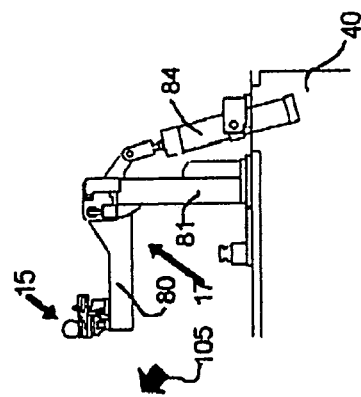
FIG. 8 is a simplified schematic side representation of a portion of the synchronous welding system of FIG. 8 showing the drive shaft support in a deployed position for supporting the drive shaft.

FIG. 8 is a simplified schematic side representation of deployable drive shaft support 17 in a deployed position for supporting drive shaft tube 15. As shown, hydraulic cylinder 84 is in a withdrawn condition, whereby support platform 80 is raised in the direction of arrow 105.

Referring once again to FIG. 7, chuck jaws 71 of chuck assembly 70 are in the open condition. Thus drive shaft tube 15 with first end piece 30 can be axially removed from chuck assembly 70.

FIG. 9 is a simplified schematic front representation of synchronous welding system 100 with drive shaft tube 15 with first end piece 30 and second end piece 32 installed thereon fully disengaged from driven chuck assembly 45 and translatable chuck assembly 50, and supported by deployable drive shaft support 17. At this stage, the completed drive shaft can be removed from deployable drive shaft support 17 and replaced by drive shaft tube 15', illustratively by human operator 11 in FIG. 1, to commence welding of another drive shaft using drive shaft tube 15', further first end piece 30', and further second end piece 32'.

Figure 10:
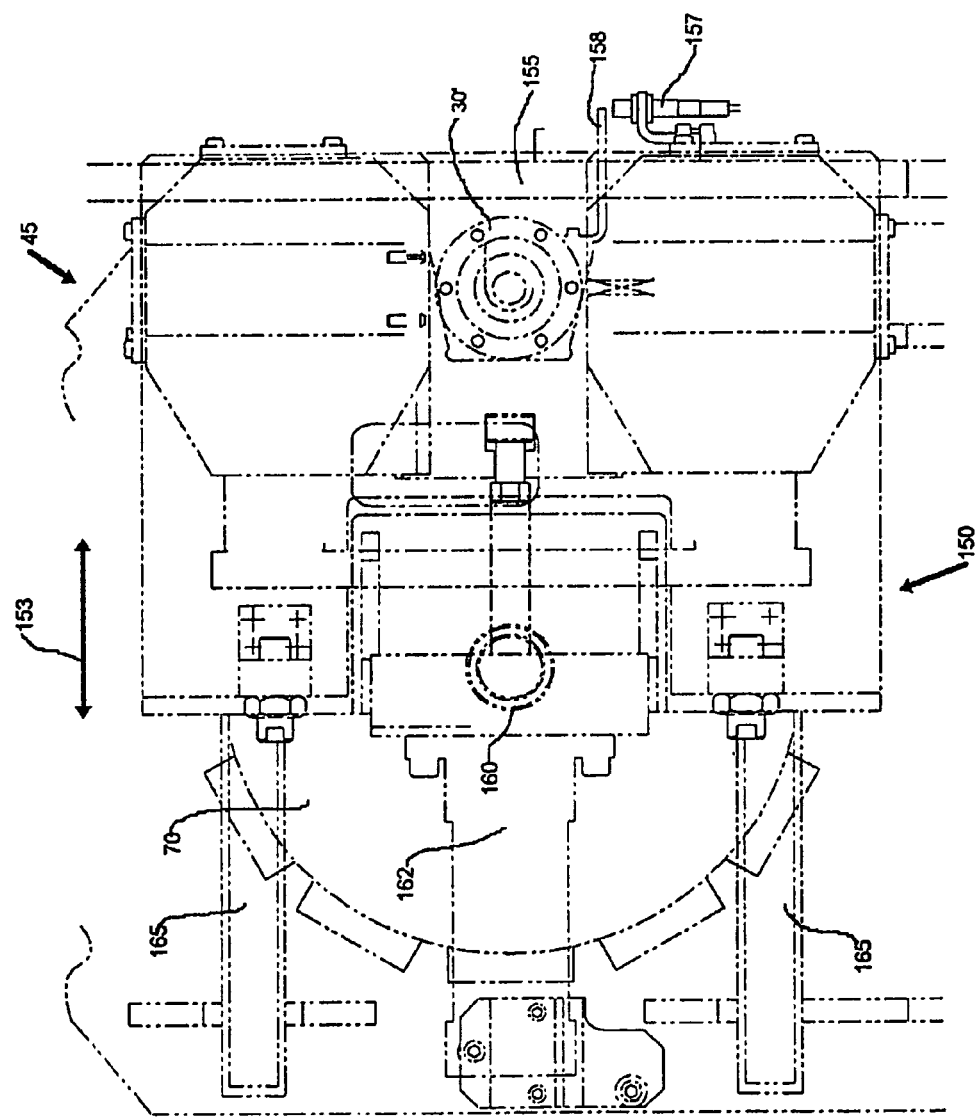
FIG. 10 is a simplified schematic partially phantom representation of the driven chuck assembly and the stationary fixture.

FIG. 10 is a simplified schematic phantom representation of driven chuck assembly 45. Elements of structure that previously have been discussed are similarly designated. As shown in this figure, chuck assembly 70 is located as a subassembly of driven chuck assembly 45, and there is additionally provided an end piece carrier that is generally designated as 150. The end piece carrier is translatable in the directions of two-headed arrow 153. End piece carrier 150 is shown to have a receptacle 155 in which is deposited further first end piece 30' in anticipation of it being installed on further drive shaft tube 15' (not shown in this figure) of FIG. 1.

Human operator 11, or a robotic arrangement (not shown), installs further first end piece 30' into receptacle 155. Upon completion of the prior drive shaft formed of first end piece 30, drive shaft tube 15, and second end piece 32, the completed drive shaft is removed from deployable drive shaft support 17 by human operator 11, and further drive shaft tube 15' is installed thereon by the human operator. End piece carrier 150 is translated toward the left whereby further first end piece 30' is caused to be installed in a first central clamping station 160. Such translation is effected by actuation of hydraulic actuator 162, which urges end piece carrier 150 along tracks 165. First central clamping station 160 maintains the relocated further first end piece 30' in a clamped so as to be non-rotatable and axially co-located with further drive shaft tube 15' (not shown in this figure) during the friction welding process, which proceeds as described hereinabove with respect to the welding of first end piece 30 and drive shaft tube 15.

In controlling the operation of the translation of end piece carrier 150, its location is determined by a sensor 157 that is of the proximity type. Sensor 157 issues an electrical signal responsive to the proximity of sensor arm 158.

Figure 11C:
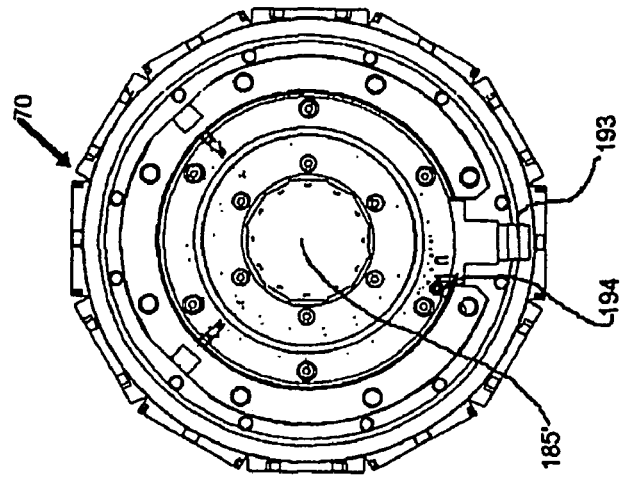
FIGS. 11A, 11B, and 11C are respective simplified schematic front, cross-sectional side, and back representations of a chuck arrangement constructed in accordance with the principles of the invention.
Figure 11B:
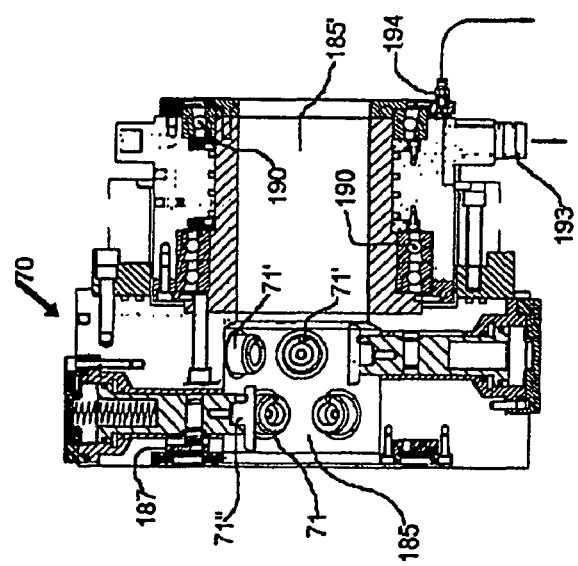
Figure 11A:
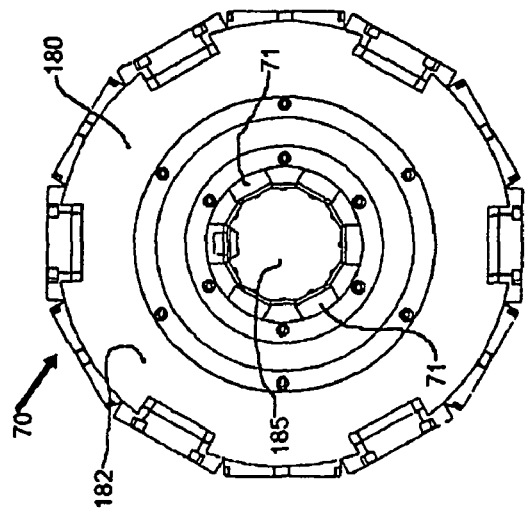

FIGS. 11A, 11B, and 11C are respective simplified schematic front, cross-sectional side, and back representations of chuck assembly 70. Elements of structure that previously have been discussed are similarly designated. As shown in FIG. 11A, chuck assembly 70 is provided with a housing 180 having a substantially planar forward surface 182 having a central aperture 185 therethrough. Radially inward of central aperture 185 are a plurality of chuck jaws 71. Twelve such chuck jaws are shown in this figure, and it can be seen in FIG. 11B that more than one row of jaws are employed in this specific illustrative embodiment of the invention. Chuck jaws that are located proximal to cam plate 187 are designated as chuck jaws 71, and those that are disposed axially inward are designated chuck jaws 71'. Cam plate 187 controls the rate of actuation and the centralization of three of chuck jaws 71, one of which is controlled chuck jaw 71". The two other controlled chuck jaws are not shown in this cross-sectional representation. The operation of cam plate 187 has been described hereinabove in connection with FIG. 5.

Chuck assembly 70 is, as previously stated, rotatable in response to electric motor 56 (not shown in this figure) and drive belt 57 (not shown in this figure). The chuck assembly is rotated on bearings 190, shown in FIG. 11B.

FIG. 11C is a representation of chuck assembly 70 from the back. Central aperture 185 is designated from this direction as 185'. FIGS. 11B and 11C show drain port 193 and drain line 194 through which hydraulic oil is discharged. These elements will be described in greater detail in connection with FIG. 12.

Figure 12:
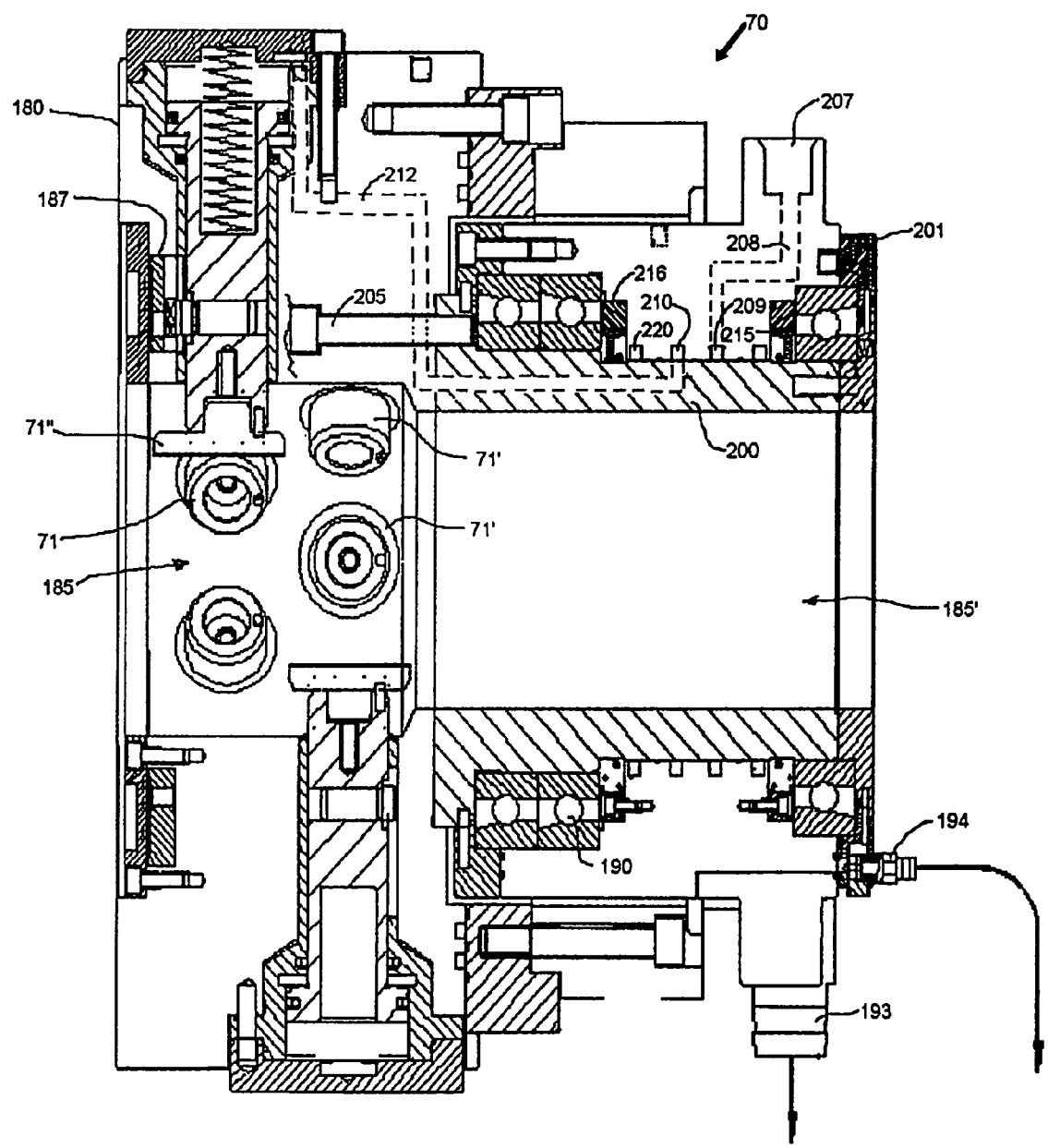
FIG. 12 is an expanded representation of FIG. 11B showing in greater detail additional internal features, such as fluid passageways.

FIG. 12 is an enlarged representation of chuck assembly 70, as shown in FIG. 11B, further showing in greater detail additional internal features. Elements of structure that previously have been discussed are similarly designated. As shown in FIG. 12, chuck assembly 70 is provided with a rotatable housing 200 and a non-rotating housing 201. The rotating and non-rotating housings are shown on opposite sides of bearings 190. Rotatable housing 200 is coupled to housing 180 by a fastener 205. Thus, housing 180 is also rotatable.

Non-rotating housing 201 has a stationary fluid inlet port 207 that, in this specific illustrative embodiment of the invention, receives pressurized fluid (not shown) from a source (not shown). The pressurized fluid received at stationary fluid inlet port 207 is delivered via an internal channel 208 to an unclamping supply port 209 for effecting unclamping of chuck jaws 71. Pressurized fluid for clamping of the chuck jaws is received at a clamping fluid inlet port 210 that is connected by a channel 212 (shown in phantom) to chuck jaws 71". Further fluid channels (not shown) are provided to supply pressurized fluid for clamping and unclamping to the other chuck jaws.

As can be seen, unclamping supply port 209 and clamping fluid inlet port 210 are but labyrinth grooves in non-rotating housing 201 at the interface of rotatable housing 200. In a practical embodiment of the invention, there is provided between the non-rotating and rotatable housings a clearance of approximately 0.002". End seals 215 and 216 limit leakage to the bearings of the fluid that bypasses internal drain port 220. In this specific illustrative embodiment of the invention, two such drain ports are provided. Fluid that is bypassed via the bearings is expelled at drain line 194, and the remaining fluid is expelled at external port 193.

Although the invention has been described in terms of specific embodiments and applications, persons skilled in the art can, in light of this teaching, generate additional embodiments without exceeding the scope or departing from the spirit of the invention claimed herein. Accordingly, it is to be understood that the drawing and description in this disclosure are proffered to facilitate comprehension of the invention, and should not be construed to limit the scope thereof.

What is claimed is:

1. An arrangement for welding first and second shaft termination elements at respective first and second ends of a cylindrical shaft, and in alignment with a predetermined axis, the arrangement comprising:

a shaft receiver for receiving the cylindrical shaft;

a first chuck assembly having a plurality of first gripping elements for gripping the cylindrical shaft at the first end thereof and maintaining the cylindrical shaft in alignment with the predetermined axis;

a rotatory drive coupled to said first chuck assembly;

a second chuck assembly having a plurality of gripping elements for gripping the cylindrical shaft at the second end thereof in alignment with the predetermined axis;

a chuck assembly drive for translating said second chuck assembly between first and second axial positions;

a first shaft termination element receiver for receiving the first shaft termination element and axially translating same to a first installation position in alignment with the predetermined axis;

a first installation drive arrangement for urging the first shaft termination element axially toward the cylindrical shaft as the cylindrical shaft is rotated in response to said rotatory drive;

a second shaft termination element receiver for receiving the second shaft termination element and axially translating same to a second installation position in alignment with the predetermined axis; and a second installation drive arrangement for urging the second shaft termination element axially toward the cylindrical shaft as the cylindrical shaft is rotated in response to said rotatory drive;

wherein said first and second installation drive arrangements urge said first and second shaft termination elements, respectively, axially toward the cylindrical shaft as the cylindrical shaft is rotated by applying respective first and second axial forces independent of one another and in respective axially opposing directions, the respective first and second axial forces each being exerted at respective magnitudes of axial force for respective determined periods of time.

2. The arrangement of claim 1, wherein there is further provided a shaft receiver drive arrangement for translating said shaft receiver between a first shaft receiver position where the cylindrical shaft is supported by said shaft receiver at a transaxial location that is substantially in axial alignment with said first chuck assembly, and a second shaft receiver position distal from the first shaft receiver position.

3. The arrangement of claim 1, wherein the cylindrical shaft is axially displaceable with respect to said shaft receiver.

4. The arrangement of claim 1, wherein said chuck assembly drive comprises a pneumatic drive.

5. The arrangement of claim 1, wherein said rotatory drive urges said first chuck assembly to rotate at approximately between 500 to 6000 rpm.

6. The arrangement of claim 5, wherein the cylindrical shaft is a drive shaft for a vehicle, and said rotatory drive urges said first chuck assembly to rotate preferably at approximately between 500 to 6000 rpm.

7. The arrangement of claim 1, wherein said plurality of first gripping elements of said first chuck assembly comprises first and second sets of jaws.

8. The arrangement of claim 7, wherein said first set of jaws is arranged to communicate with the cylindrical shaft prior to said second set of jaws.

9. The arrangement of claim 8, wherein said first set of jaws comprises a precision alignment arrangement for locking the cylindrical shaft at a predetermined axial location.

10. The arrangement of claim 9, wherein said precision alignment arrangement comprises a plurality of angulated guideways associated with respective jaws of said first set of jaws, said angulated guideways having a precise angular orientation with respect to one another.

11. The arrangement of claim 10, wherein said plurality of angulated guideways are equiangularly distributed about the predetermined axis.

12. The arrangement of claim 9, wherein said second set of jaws comprises a clamping arrangement for locking the cylindrical shaft at the predetermined axial location determined by said first set of jaws.

13. The arrangement of claim 12, wherein said first and second sets of jaws are hydraulically actuated.

14. The arrangement of claim 13, wherein said second set of jaws are operated in response to a first hydraulic pressure applied to said first set of jaws exceeding a predetermined break-over first hydraulic pressure value.

15. The arrangement of claim 14, wherein said break-over first hydraulic pressure has a magnitude sufficient to cause said first set of jaws to lock the cylindrical shaft at the predetermined axial location.

16. The arrangement of claim 1, wherein there is further provided a non-rotating housing about which said first chuck assembly is rotated by said rotatory drive.

17. The arrangement of claim 16, wherein said first chuck assembly is installed on a rotatable housing, and there is further provided a fluid delivery arrangement disposed at the interface of said non-rotating and said rotatable housings.

18. The arrangement of claim 17, wherein said fluid delivery arrangement comprises:
a first fluid channel system for supplying pressurized clamping fluid for causing said first chuck assembly to grip the cylindrical shaft; and
a second fluid channel system for supplying pressurized unclamping fluid for causing said first chuck assembly to release the cylindrical shaft.

19. The arrangement of claim 18, wherein said first fluid channel system comprises a first fluid passageway at the interface of said non-rotating and said rotatable housings.

20. The arrangement of claim 18, wherein said second fluid channel system comprises a first fluid passageway at the interface of said non-rotating and said rotatable housings.

21. The arrangement of claim 18, wherein there is further provided a pressurized fluid supply port installed on said non-rotating housing.

22. The arrangement of claim 18, wherein there is further provided a fluid drain port installed on said non-rotating housing.

23. The arrangement of claim 17, wherein there is further provided a bearing arrangement interposed between said non-rotating and said rotatable housings.

24. The arrangement of claim 23, wherein there is further provided a fluid seal for limiting flow of a pressurized fluid through the bearing arrangement.

25. The arrangement of claim 1, wherein at least one of the first and second axial forces is applied at a plurality of magnitudes of axial force for respective determined sequential periods of time.

26. The arrangement of claim 25, wherein at least one of the first and second axial forces is applied in response to a distance of axial displacement resulting from the application of the respective first and second axial forces.

27. The arrangement of claim 25, wherein at least one of the first and second axial forces is applied in response to a temperature resulting from the application of the respective first and second axial forces.

28. The arrangement of claim 27, wherein the temperature is controlled in response to the modulation of the weld force between tube ends and their respective yokes while rotating the tube.

29. The arrangement of claim 28 wherein the cylindrical shaft is rotated at a fixed preselected speed.

30. The arrangement of claim 27, wherein the cylindrical shaft is rotated at a speed determined in response to the diameter of the cylindrical shaft.

31. The arrangement of claim 27, wherein the cylindrical shaft is rotated at a speed that achieves a determined rotational surface speed of the cylindrical shaft.

32. The arrangement of claim 25, wherein the respective determined sequential periods of time correspond to engagement phases of an installation of the first shaft termination element.

33. The arrangement of claim 32, wherein the engagement phases of the installation of the first shaft termination element comprise a heating phase and a forging phase.

34. The arrangement of claim 33, wherein, the cylindrical shaft is a drive shaft for a vehicle, and said first installation drive arrangement is operated to apply approximately between 250 to 3000 pounds of axial force for a duration of approximately between 1.5 and 10 seconds during the heating phase, and to apply approximately between 1500 to 12000 pounds of axial force for a duration of approximately between 1 and 15 seconds during the forging phase.

35. The arrangement of claim 33, wherein prior to performing the heating and forging phases there is provided the further phase of scrubbing the first shaft termination element against the first end of the cylindrical shaft.

36. The arrangement of claim 35, wherein the cylindrical shaft is a drive shaft for a vehicle, and said first installation drive arrangement is operated to apply approximately between 50 to 350 pounds of axial force for a duration of approximately between 0.5 and 10 seconds during the further phase of scrubbing.

37. The arrangement of claim 35, wherein the further phase of scrubbing the first shaft termination element against the first end of the cylindrical shaft causes a change in the overall length of the cylindrical shaft and the installed terminations.

38. A method of welding first and second shaft termination elements at respective first and second ends of a cylindrical shaft, and in alignment with a predetermined axis, the method comprising the steps of:

cylindrical shaft loading a cylindrical shaft having first and second ends onto a shaft receiver located at a proximal location, whereby the cylindrical shaft is supported so that its longitudinal axis is substantially coaxial with the predetermined axis;

first element loading the first shaft termination element onto a first shaft termination element receiver;

second element loading the second shaft termination element onto a second shaft termination element receiver;

first translating the first shaft termination element receiver whereby a principal axis of the first shaft termination element is disposed coaxially with the predetermined axis;

second translating the second shaft termination element receiver whereby a principal axis of the second shaft termination element is disposed coaxially with the predetermined axis;

axially urging the cylindrical shaft toward the first shaft termination element and through a first chuck assembly;

first actuating the jaws of the first chuck whereby the cylindrical shaft is clamped in the region of the first end thereof to a transaxial location where the longitudinal axis of the cylindrical shaft is coaxial with the predetermined axis;

axially translating the second shaft termination element and a second chuck assembly to a predetermined axial location in the region of the second end of the cylindrical shaft;

second actuating the jaws of the second chuck whereby the cylindrical shaft is clamped in the region of the second end thereof to a transaxial location where the longitudinal axis of the cylindrical shaft is coaxial with the predetermined axis;

rotating the first chuck at a predetermined rate of rotation;

first urging the first shaft termination element axially into communication with the first end of the cylindrical shaft as the shaft is rotated by applying a first axial force; and second urging the second shaft termination element axially into communication with the second end of the cylindrical shaft as the shaft is rotated by applying a second axial force independent of and opposing said first axial force;

wherein said respective first and second axial forces each being exerted at respective magnitudes of axial force for respective determined periods of time.

39. The method of claim 38, wherein, prior to performing said step of axially translating there is further provided the step of withdrawing the shaft receiver to a distal location.

40. The method of claim 38, wherein there are further provided the steps of:

first releasing the first axial force applied to the first shaft termination element in response to said step of first urging;

second releasing the second axial force applied to the second shaft termination element in response to said step of second urging;

releasing the jaws of the second chuck; and withdrawing axially the second chuck assembly to a distal axial location.

41. The method of claim 40, wherein there are further provided the steps of:

restoring the shaft receiver to the proximal location;

releasing the jaws of the first chuck; and reverse axially urging the cylindrical shaft out of the first chuck assembly, whereby the cylindrical shaft is supported by the shaft receiver.

42. The method of claim 38, wherein said step of first actuating comprises the further steps of:

first subset actuating a first subset of jaws;

controlling the performance of said step of first subset actuation to ensure all of the jaws in said first subset of jaws maintain an equal radial relationship during said step of first subset actuation with respect to the predetermined axis.

43. The method of claim 42, wherein said step of first actuating comprises the further step of second subset actuating a second subset of jaws, said step of second subset actuating being performed after said step of first subset actuating.

44. The method of claim 43, wherein said step of first actuating is performed in response to a step of applying an hydraulic pressure, and said step of second subset actuating is performed in response to the hydraulic pressure exceeding a predetermined hydraulic pressure magnitude.

* * * * *